United States Patent

Yonezawa

(10) Patent No.: US 10,841,477 B2
(45) Date of Patent: Nov. 17, 2020

(54) ACCESSORY APPARATUS, CAMERA SYSTEM HAVING THE SAME, AND STORAGE MEDIUM

(71) Applicant: CANON KABUSHIKI KAISHA, Tokyo (JP)

(72) Inventor: Takeshi Yonezawa, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/413,668

(22) Filed: May 16, 2019

(65) Prior Publication Data

US 2019/0356840 A1 Nov. 21, 2019

(30) Foreign Application Priority Data

May 17, 2018 (JP) .................................. 2018-095098

(51) Int. Cl.
*H04N 5/232* (2006.01)
*G03B 17/14* (2006.01)
*G03B 17/56* (2006.01)

(52) U.S. Cl.
CPC ......... *H04N 5/23203* (2013.01); *G03B 17/14* (2013.01); *G03B 17/565* (2013.01); *H04N 5/23209* (2013.01)

(58) Field of Classification Search
None
See application file for complete search history.

(56) References Cited

U.S. PATENT DOCUMENTS

| 4,769,665 A | 9/1988 | Dagborn |
| 2011/0229115 A1* | 9/2011 | Okada .................... G03B 17/14 396/71 |

(Continued)

FOREIGN PATENT DOCUMENTS

| EP | 2849430 A1 | 3/2015 |
| EP | 3410697 A1 | 12/2018 |

(Continued)

OTHER PUBLICATIONS

Extended European Search Report issued by the European Patent Office dated Oct. 16, 2019 in corresponding European Patent Application No. 19174474.7.

*Primary Examiner* — Twyler L Haskins
*Assistant Examiner* — Wesley J Chiu
(74) *Attorney, Agent, or Firm* — Carter, DeLuca & Farrell LLP

(57) ABSTRACT

An accessory apparatus attachable to and detachable from a camera, the accessory apparatus includes an accessory controller configured to control a communication with the camera using a notification channel used to transmit a signal between the camera and the accessory apparatus and a data communication channel used for a data communication between the camera and the accessory apparatus. The accessory controller switches between a first communication method used for communications between the camera and all accessory apparatuses connected to the camera and a second communication method used for an individual communication with the camera. The accessory controller switches, in the second communication method, from the second communication method to the first communication method when detecting a start of the data communication in the first communication method in the communication.

15 Claims, 12 Drawing Sheets

(56) References Cited

U.S. PATENT DOCUMENTS

| | | | |
|---|---|---|---|
| 2011/0229118 A1* | 9/2011 | Imafuji | H04N 5/23209 396/529 |
| 2012/0033955 A1* | 2/2012 | Okada | G03B 17/565 396/71 |
| 2012/0063016 A1* | 3/2012 | Imafuji | G03B 17/14 359/822 |
| 2015/0070521 A1* | 3/2015 | Yasuda | G03B 17/565 348/211.1 |
| 2015/0116592 A1* | 4/2015 | Suzuki | G03B 17/14 348/375 |
| 2018/0224720 A1* | 8/2018 | Pan | H04N 5/232 |
| 2020/0092461 A1* | 3/2020 | Watanabe | H04N 5/2254 |
| 2020/0120259 A1* | 4/2020 | Sugiyama | H04N 5/23206 |

FOREIGN PATENT DOCUMENTS

| | | | |
|---|---|---|---|
| JP | 3658084 B2 | | 6/2005 |
| JP | 2019091066 A | * | 6/2019 |

* cited by examiner

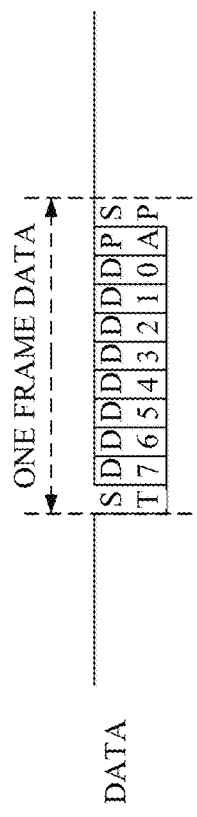
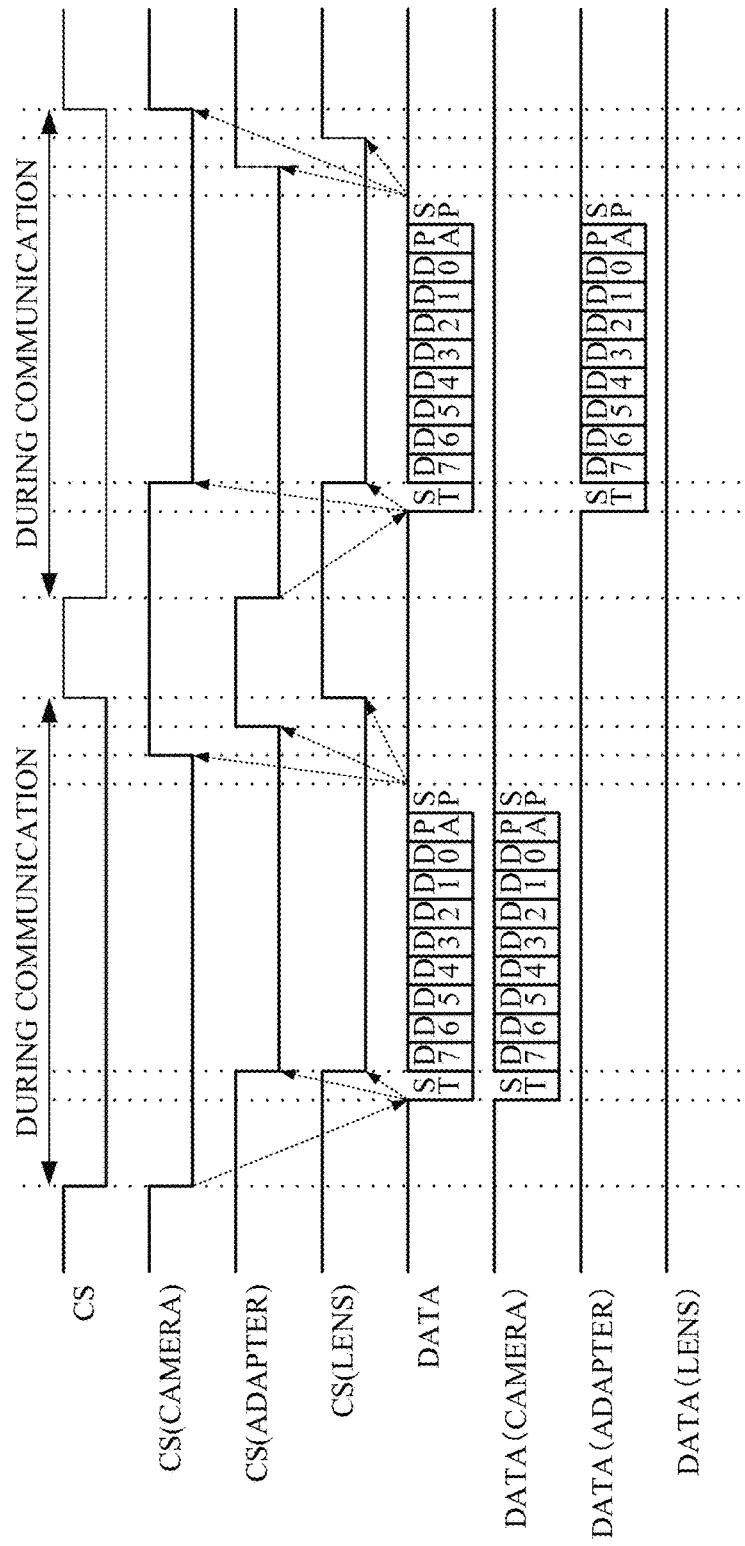

ACCESSORY APPARATUS, CAMERA SYSTEM HAVING THE SAME, AND STORAGE MEDIUM

BACKGROUND OF THE INVENTION

Field of the Invention

The present invention relates to an accessory apparatus, a camera system having the same, and a storage medium or program.

Description of the Related Art

In one conventional lens interchangeable type camera system, a camera performs imaging processing, image recording, and an interchangeable lens control, and an interchangeable lens performs focus driving and diaphragm driving in accordance with a control command from the camera. This camera system transmits the control command from the camera to the interchangeable lens and lens information (data) from the interchangeable lens to the camera via a communication channel for exchanging information between them.

A digital camera system among the lens interchangeable type camera systems needs a smooth lens control in synchronization with an imaging period in motion image capturing and live-view displaying. It is thus necessary to synchronize the imaging timing of the camera with the control timing of the interchangeable lens, and the camera needs to complete acquiring the lens information necessary for the lens control and transmitting the control command to the interchangeable lens within the imaging period. A data amount of the lens information acquired by the camera from the interchangeable lens has recently increased with the sophisticated imaging control, and it is necessary to communicate a large data amount within a short time period by a shorter imaging period (or a higher frame rate).

The lens interchangeable type camera system may include an accessory apparatus in addition to the interchangeable lens, such as a wide-angle converter and a telephoto converter, which is attached between the camera and the interchangeable lens and changes a focal length of the interchangeable lens. Since information between the converter and the camera is exchanged via a communication channel, a system is required which is capable of "one-to-many" communications between the camera and a plurality of accessory apparatuses such as an interchangeable lens and a converter.

Japanese Patent No. 3658084 discloses a three-line type clock synchronous communication system including a "clock line," a "data transmission line from a camera to an interchangeable lens," and a "data transmission line from the interchangeable lens to the camera."

The communication system disclosed in Japanese Patent No. 3658084 is compatible with only the one-to-one communication between the camera and the interchangeable lens, and cannot provide the one-to-many communications between the camera and a plurality of accessory apparatuses such as the interchangeable lens and the converter. In addition, the communication system needs three signal lines, which may cause a larger size of the system.

A communication control method using an inter-integrated circuit (I2C) communication system has conventionally been proposed for the "one-to-many" communication with a small number of signal lines. The I2C communication system is compatible with the "one-to-many" communications only with two lines of a "serial clock line" and a "serial data line," but the I2C communication system as an open drain system has difficulties in accelerating the communication speed.

SUMMARY OF THE INVENTION

The present invention provides an accessory apparatus for a camera system, a camera system having the same, and a storage medium (program), each of which can realize a communication for an information transmission between a camera and a plurality of accessory apparatuses with a small number of connection signal lines.

An accessory apparatus according to one aspect of the present invention attachable to and detachable from a camera, the accessory apparatus includes an accessory controller configured to control a communication with the camera using a notification channel used to transmit a signal between the camera and the accessory apparatus and a data communication channel used for a data communication between the camera and the accessory apparatus. The accessory controller is configured to switch between a first communication method used for communications between the camera and all accessory apparatuses connected to the camera and a second communication method used for an individual communication with the camera. The accessory controller is configured to switch, in the second communication method, from the second communication method to the first communication method when detecting a start of the data communication in the first communication method in the communication.

A camera system according to another aspect of the present invention includes the above accessory apparatus, and a camera including an image sensor configured to photoelectrically convert an object image and to output an electric signal, wherein the accessory apparatus is detachably attached to the camera.

A non-transitory computer-readable storage medium according to another aspect of the present invention storing a program that enables a computer in an accessory apparatus to execute a method. The accessory apparatus is attachable to and detachable from a camera. The accessory apparatus includes an accessory controller configured to control a communication with the camera using a notification channel used to transmit a signal between the camera and the accessory apparatus and a data communication channel used for a data communication between the camera and the accessory apparatus. The method includes the steps of switching between a first communication method used for communications between the camera and all accessory apparatuses connected to the camera and a second communication method used for an individual communication with the camera, and switching, in the second communication method, from the second communication method to the first communication method when detecting a start of the data communication in the first communication method in the communication.

Further features of the present invention will become apparent from the following description of exemplary embodiments with reference to the attached drawings.

BRIEF DESCRIPTION OF THE DRAWINGS

FIG. 3 illustrates a format of data transmitted and received according to the present invention.

FIG. 4 illustrates a communication waveform in a broadcast communication.

DESCRIPTION OF THE EMBODIMENTS

Figure 1:
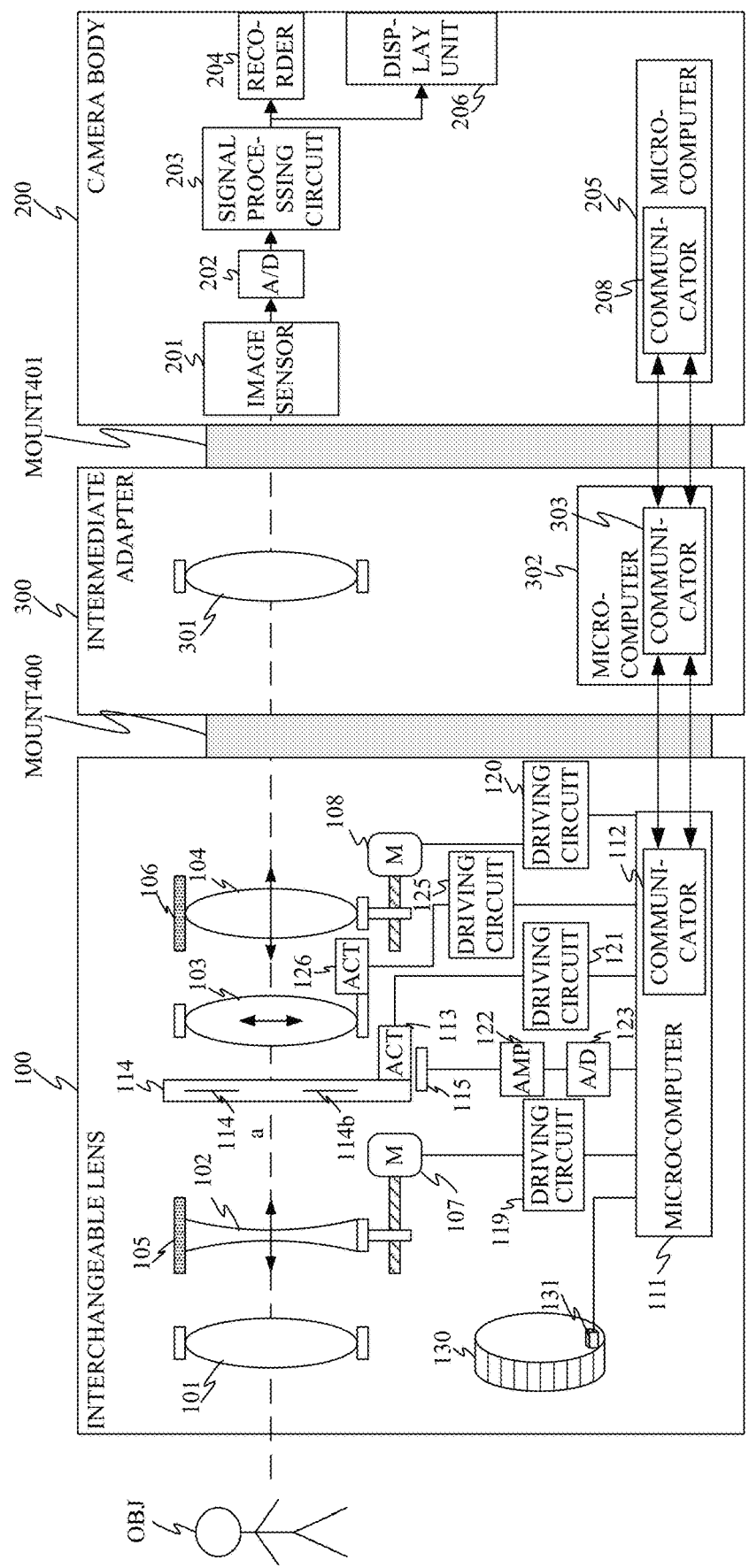
FIG. 1 is a block diagram illustrating a configuration of a camera system including a camera and an accessory apparatus according to the present invention.

Referring now to the accompanying drawings, a detailed description will be given of embodiments according to the present invention. The same components in each figure will be designated by the same reference numerals, and a duplicate description thereof will be omitted. Communications based on a plurality of communication methods are available between the accessory apparatus and the camera. The "communication method" includes a broadcast communication method (first communication method) and a P2P (peer to peer) communication method (second communication method).

<Description of Configuration of Camera System>

FIG. 1 is a block diagram of a configuration of a camera system according to the present invention including a camera 200, an intermediate adapter 300 detachable from the camera 200 and an interchangeable lens 100 as accessory apparatuses. The accessory apparatuses such as the interchangeable lens 100 and the intermediate adapter 300, and the camera 200 transmits a control command and internal information between them using their communicators. Each communicator supports a plurality of communication methods, switches to the same communication method in synchronization with each other according to the type of data to be communicated and the communication purpose, and thereby selects an optimum communication method suitable for each of a variety of situations. Although FIG. 1 illustrates a configuration in which the intermediate adapter 300 is attached to the camera 200 as an example, the present invention is not limited to this embodiment. The interchangeable lens 100 may be mounted directly to the camera 200 or may be mounted to the camera 200 via one or more intermediate adapters.

The interchangeable lens 100 and the intermediate adapter 300 are mechanically and electrically connected via a mount 400 which is a coupling mechanism. Similarly, the intermediate adapter 300 and the camera 200 are mechanically and electrically connected via a mount 401 which is a coupling mechanism. The interchangeable lens 100 and the intermediate adapter 300 obtain the electric power from the camera 200 through power supply terminals (not shown) provided to the mounts 400 and 401, and supply the power for operations necessary for a variety of actuators and microcomputers in them as described later. The interchangeable lens 100, the camera 200, and the intermediate adapter 300 communicate with each other through communication terminals (illustrated in FIG. 2) provided to the mounts 400 and 401.

The interchangeable lens 100 includes an imaging optical system. The imaging optical system includes, in order from an object OBJ side, a field lens 101, a zoom lens (magnification varying lens) 102 that changes a magnification, a diaphragm unit 114 that adjusts a light amount, an image stabilization lens 103, and a focus lens 104 for focusing.

The zoom lens 102 and the focus lens 104 are held by lens holding frames 105 and 106, respectively. The lens holding frames 105 and 106 are movably guided in an optical axis direction (indicated by a broken line in the figure) by a guide shaft (not shown), and are driven in the optical axis direction by stepping motors 107 and 108. The stepping motors 107 and 108 move the zoom lens 102 and the focus lens 104 in synchronization with a driving pulse, respectively.

The image stabilization lens 103 shifts in a direction orthogonal to the optical axis in the imaging optical system to reduce image blurs caused by a camera shake such as a hand shake.

A lens microcomputer 111 serves as a lens controller (accessory controller) that controls the operation of each component in the interchangeable lens 100. The lens microcomputer 111 receives a control command and a transmission request command transmitted from the camera 200 via a lens communicator 112 as an accessory communicator. The lens microcomputer 111 performs a lens control corresponding to the control command, and transmits lens data corresponding to the transmission request command to the camera 200 via the lens communicator 112.

The lens microcomputer 111 outputs a driving signal to a zoom driving circuit 119 and a focus driving circuit 120 in response to a command relating to zooming and focusing among the control commands to drive the stepping motors 107 and 108. This configuration can provide zoom processing for controlling the magnification varying operation with the zoom lens 102 and AF (autofocus) processing for controlling the focusing operation with the focus lens 104.

The diaphragm unit 114 includes aperture blades 114a and 114b. The states of the aperture blades 114a and 114b are detected by a Hall element 115, and are input to the lens microcomputer 111 via an amplifier circuit 122 and an A/D converter 123. The lens microcomputer 111 outputs a driving signal to a diaphragm driving circuit 121 based on an input signal from the A/D converter 123 to drive a diaphragm actuator 113. Thereby, a light amount adjustment operation by the diaphragm unit 114 is controlled.

The lens microcomputer 111 controls an image stabilization actuator (voice coil motor etc.) 126 via an image stabilization driving circuit 125 in accordance with the camera shake detected by a shake sensor (not shown) such as a vibration gyro provided in the interchangeable lens 100. Thereby, the image stabilization processing for controlling the shift operation (image stabilization operation) of the image stabilization lens 103 is performed.

The interchangeable lens 100 includes an operation ring 130 and an operation ring detector 131. The operation ring detector 131 includes, for example, two photo-interrupters that output two-phase signals according to a relative movement of the operation ring 130. The lens microcomputer 111 can detect the operation of the operation ring 130. The lens microcomputer 111 can notify the camera microcomputer 205 of the operation amount of the operation ring 130 via the lens communicator 112.

The intermediate adapter 300 is, for example, an extender for changing the focal length, and includes a magnification varying lens 301 and an adapter microcomputer (referred to as an adapter microcomputer hereinafter) 302. The adapter microcomputer 302 is an intermediate adapter controller (accessory controller) that controls the operation of each component in the intermediate adapter 300. The adapter microcomputer 302 receives a control command and a transmission request command transmitted from the camera 200 via an adapter communicator 303 as an accessory communicator. The adapter microcomputer 302 performs an intermediate adapter control corresponding to the control command, and transmits intermediate adapter data corresponding to the transmission request command to the camera 200 via the adapter communicator 303.

The camera 200 includes an image sensor 201 such as a CCD sensor or a CMOS sensor, an A/D conversion circuit 202, a signal processing circuit 203, a recorder 204, a camera microcomputer (referred to as a camera microcomputer hereinafter) 205, and a display unit 206.

The image sensor 201 photoelectrically converts an object image formed by the imaging optical system in the interchangeable lens 100 and outputs an electrical signal (analog signal). The A/D converter 202 converts an analog signal from the image sensor 201 into a digital signal. The signal processing circuit 203 performs various types of image processing for the digital signal from the A/D converter 202 and generates an image signal. The signal processing circuit 203 also generates, from the image signal, focus information indicating a contrast state of an object image (focus state of the imaging optical system) and luminance information indicating an exposure state. The signal processing circuit 203 outputs the image signal to the display unit 206, and the display unit 206 displays the image signal as a live-view image used for a confirmation of a composition, a focus state, etc.

A camera microcomputer 205 as a camera controller controls the camera 200 according to an input from a camera operation member such as an unillustrated imaging instructing switch and a variety of setting switches. The camera microcomputer 205 transmits a control command relating to the magnification varying operation of the zoom lens 102 to the lens microcomputer 111 according to the operation of an unillustrated zoom switch via the camera communicator 208. The camera microcomputer 205 transmits, to the lens microcomputer 111 via the camera communicator 208 a control command relating to the light amount adjustment operation of the diaphragm unit 114 according to the luminance information and the focusing operation of the focus lens 104 according to the focus information. The camera microcomputer 205 transmits a transmission request command for acquiring the control information and status information of the interchangeable lens 100 to the lens microcomputer 111, and transmits to the adapter microcomputer 302 a transmission request command for acquiring the control information and status information of the intermediate adapter 300.

Figure 2:
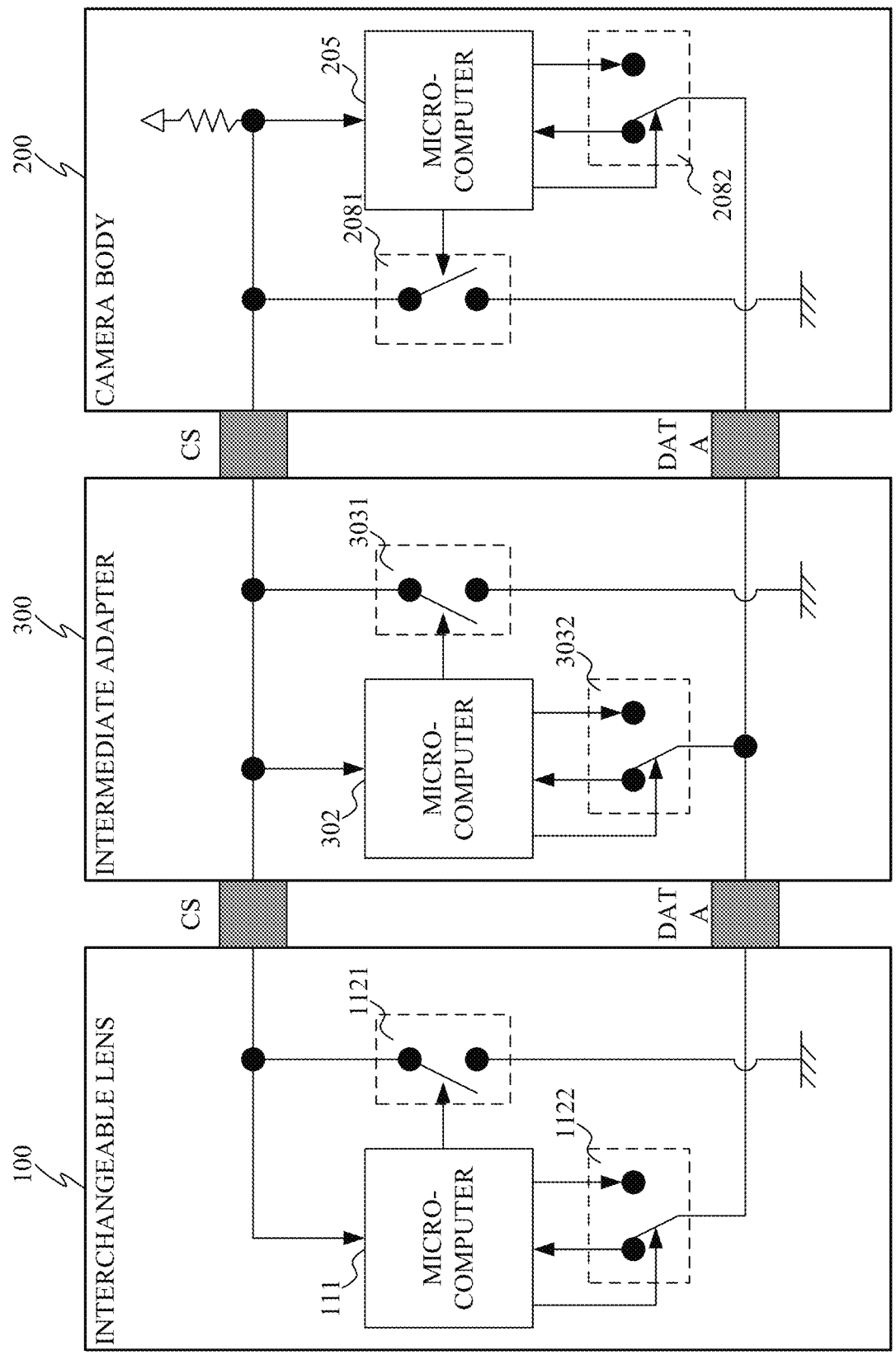
FIG. 2 schematically illustrates a communication circuit in the camera system according to the present invention.

Referring now to FIG. 2, a description will be given of a communication circuit configured in the camera system including the camera 200, the interchangeable lens 100, and the intermediate adapter 300. FIG. 2 schematically illustrates a communication circuit in the camera system according to the present invention.

The camera microcomputer 205, the lens microcomputer 111, and the adapter microcomputer 302 achieve communications using signal lines connected via communication terminal units provided on the mounts 400 and 401. There are two signal lines or a signal line (notification channel) CS that propagates a signal for a communication flow control, and is used to transmit a signal, and a signal line (data communication channel) DATA that propagates data to be transmitted and received and is used for a data communication.

The signal line CS is connected to the camera microcomputer 205, the lens microcomputer 111, and the adapter microcomputer 302, and each microcomputer can detect the signal level (voltage level) of the signal line. The signal line CS is connected to ground via a ground switch 1121 in the interchangeable lens 100, a ground switch 2081 in the camera 200, and a ground switch 3031 in the intermediate adapter 300 while pull-up-connected to the power supply in the camera 200. In other words, the signal line CS is open drain connected. With this configuration, each of the interchangeable lens 100, the camera 200, and the intermediate adapter 300 can set the signal level of the signal line CS to a low level (first level) by turning on (connecting) each ground switch. On the other hand, the signal level of the signal line CS can be set to a high level (second level) by turning off (cutting off) each connection switch of all of the interchangeable lens 100, the camera 200 and the intermediate adapter 300. A detailed description will be given later of an operational procedure and the contents of the control signal propagated using the signal line CS during the communication.

The signal line DATA is a single(-line) bidirectional data transmission line that can be used while switching the data propagation direction. The signal line DATA is connectible to the lens microcomputer 111 via an input/output (I/O) switch 1122 in the interchangeable lens 100. The signal line DATA is connectible to the camera microcomputer 205 via an I/O switch 2082 in the camera 200. The signal line DATA is connectible to the adapter microcomputer 302 via an I/O switch 3032 in the intermediate adapter 300. Each microcomputer includes a data output unit (CMOS method) for transmitting data and a data input unit (CMOS method) for receiving data. Each microcomputer can select whether to connect the signal line DATA to the data output unit or to the data input unit by operating the I/O switch. With this configuration, the interchangeable lens 100, the camera 200, and the intermediate adapter 300 can transmit data by operating the I/O switch so that the signal line DATA is connected to the data output unit. The interchangeable lens 100, the camera 200, and the intermediate adapter 300 can receive data by operating the I/O switch so that the signal line DATA is connected to the data input unit. Details of the I/O switching procedure of the signal line DATA in the communication will be described later.

While FIG. 2 illustrates an illustrative communication circuit according to the present invention, the present invention is not limited to this embodiment. For example, the signal line CS may be pull-down-connected to ground in the camera 200 and connected to the unillustrated power supply via the ground switches 1121, 2081, and 3031. The signal line DATA may be always connected to the data input unit in each microcomputer, and the connection/disconnection between the signal line DATA and each data output unit may be operated by a switch.

<Description of Communication Data Format>

Referring now to FIG. 3, a description will be given of a format of data exchanged among the camera microcomputer 205, the lens microcomputer 111, and the adapter microcomputer 302. FIG. 3 illustrates the format of data transmitted and received using the signal line DATA according to the present invention. This format is common to the broadcast communication and P2P communication described later.

A communication data format is based on a so-called asynchronous communication that previously defines a communication speed between parties, and transmit and receive data at a communication bit rate pursuant to this protocol. In the non-transmission state where no data transmission is performed, the signal level is maintained at a high level. In order to notify the data reception side of the start of the data transmission, the signal level is set to the low level for one bit period (start bit ST). One-byte data is transmitted in an 8-bit period from the subsequent second bit to the ninth bit. The data bit arrangement starts with the uppermost data D7 as the MSB first format, continues to data D6 and data D5 in order, and ends with the lowermost data D0. Next, one-bit parity PA information is added to the tenth bit, and the signal level is set to a high level only for a one-bit period (stop bit SP) to indicate the end of the transmission data, whereby the transmission period of one frame data ends. Although FIG. 3 shows an illustrative communication data format according to the present invention, the present invention is not limited to this embodiment. For example, the data bit arrangement may be the LSB first or 9-bit long, or the parity PA information may not be added. The data format may be switched between the broadcast communication and the P2P communication described later.

<Description of Broadcast Communication>

Referring now to FIG. 4, a description will be given of an illustrative broadcast communication among the camera microcomputer 205, the lens microcomputer 111, and the adapter microcomputer 302. FIG. 4 illustrates a communication waveform in the broadcast communication. The broadcast communication is the one-to-many simultaneous distribution mode in which data is simultaneously transmitted from one of the camera microcomputer 205, the lens microcomputer 111, and the adapter microcomputer 302 to the other microcomputers. FIG. 4 illustrates the broadcast communication from the adapter microcomputer 302 to the camera microcomputer 205 and the lens microcomputer 111 in response to the broadcast communication from the camera microcomputer 205 to the lens microcomputer 111 and the adapter microcomputer 302.

First, the camera microcomputer 205, which is a communication master, starts a low output to the signal line CS in order to notify the lens microcomputer 111 and the adapter microcomputer 302, which are communication slaves, of starting the broadcast communication. Next, the camera microcomputer 205 outputs the data to be transmitted to the signal line DATA. On the other hand, the lens microcomputer 111 and the adapter microcomputer 302 start the low output to the signal line CS when the start bit ST input from the signal line DATA is detected. Since the camera microcomputer 205 has already started the low output to the signal line CS at this time, the signal level of the signal line CS does not change.

After completing outputting the stop bit SP, the camera microcomputer 205 stops the low output to the signal line CS. On the other hand, after the lens microcomputer 111 and the adapter microcomputer 302 receive the stop bit SP input from the signal line DATA, they analyze the received data and perform internal processing associated with the received data. Next, the lens microcomputer 111 and the adapter microcomputer 302 prepare to receive the next data, and then stop the low output to the signal line CS. As described above, the signal level of the signal line CS becomes high when all of the camera microcomputer 205, the lens microcomputer 111, and the adapter microcomputer 302 stop the low output to the signal line CS. Thus, by confirming that the signal level of the signal line CS becomes high, it can be determined that all the microcomputers have completed the processing relating to the current communication and are ready for the next communication.

After confirming that the signal level of the signal line CS returns to the high level, the adapter microcomputer 302 starts the low output to the signal line CS in order to notify the camera microcomputer 205 and the lens microcomputer 111 that the broadcast communication is to be started. Next, the adapter microcomputer 302 outputs the data to be transmitted to the signal line DATA. On the other hand, the camera microcomputer 205 and the lens microcomputer 111 start the low output to the signal line CS when the start bit ST input from the signal line DATA is detected. Since the adapter microcomputer 302 has already started the low output to the signal line CS at this time, the signal level of the signal line CS does not change.

After completing outputting the stop bit SP, the adapter microcomputer 302 stops the low output to the signal line CS. On the other hand, after receiving the stop bit SP input from the signal line DATA, the camera microcomputer 205 and the lens microcomputer 111 analyze the received data and perform internal processing associated with the received data. Next, the camera microcomputer 205 and the lens microcomputer 111 prepare to receive the next data, and then stop the low output to the signal line CS.

As described above, the signal propagated using the signal line CS in the broadcast communication acts as the control signal indicating that the broadcast communication starts and the communication process are performed.

While FIG. 4 shows an illustrative communication waveform of the broadcast communication, the present invention is not limited to this embodiment. For example, although one-byte data is transmitted in one broadcast communication is 1 byte data, it may be 2- or 3-byte data. The broadcast communication may be the one-way limited communication from the camera microcomputer 205 as the communication master to the lens microcomputer 111 and the adapter microcomputer 302 as the communication slaves.

<Description of P2P Communication>

Figure 5:
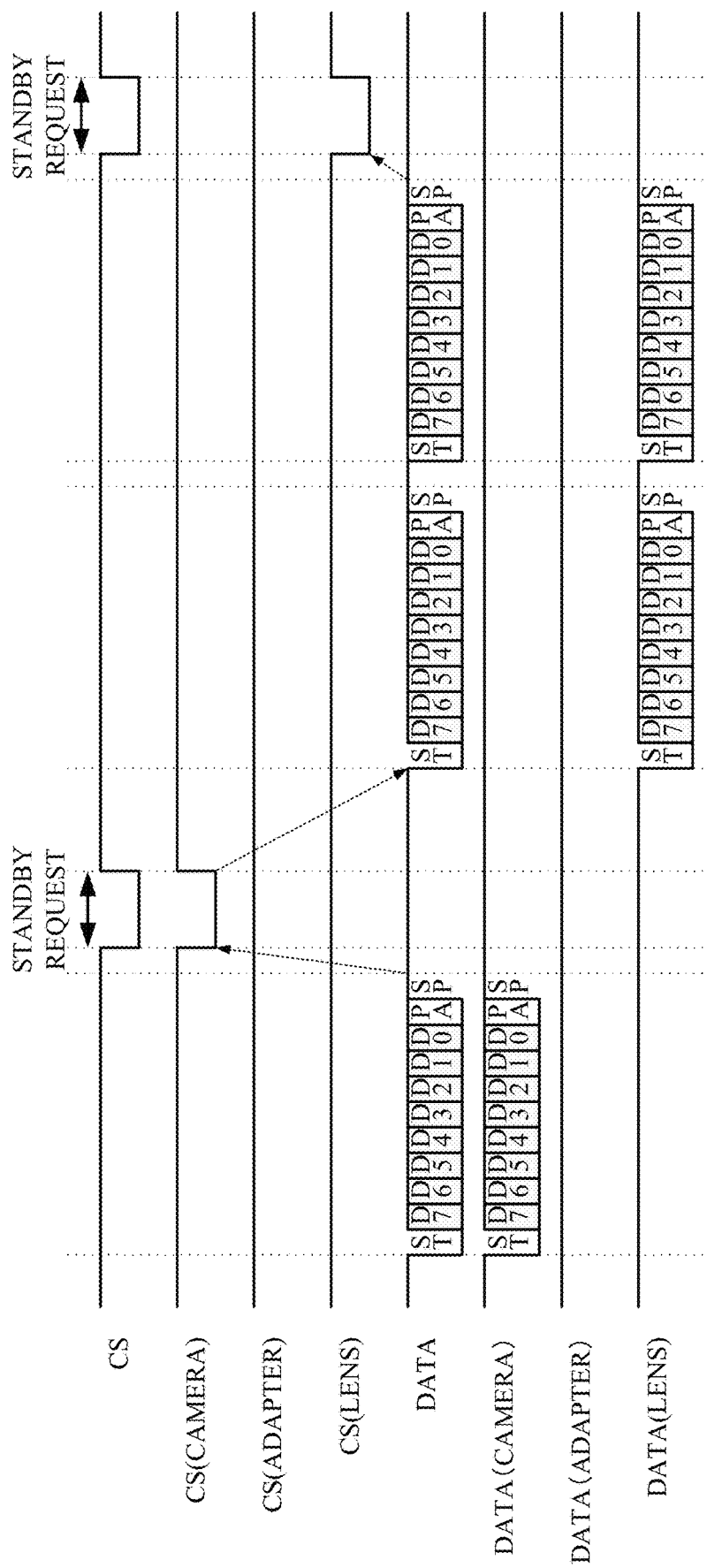
FIG. 5 illustrates a communication waveform in a P2P communication.

Referring now to FIG. 5, a description will be given of an illustrative P2P communication among the camera microcomputer 205, the lens microcomputer 111, and the adapter microcomputer 302. FIG. 5 illustrates a communication waveform in the P2P communication. The P2P communication is a one-to-one individual communication mode that transmits and receives data only between the camera microcomputer 205, and one of the lens microcomputer 111 and the adapter microcomputers 302 designated by the camera microcomputer 205. In FIG. 5, the lens microcomputer 111 is designated as the communication partner of the camera microcomputer 205, and the lens microcomputer 111 transmits two-byte data to the camera microcomputer 205 in response to the one-byte data transmission from the camera microcomputer 205. Procedures such as the designation method and switching method of the communication partner will be described later.

First, the camera microcomputer 205, which is a communication master, outputs data to be transmitted to the signal line DATA. After completing outputting the stop bit SP, the camera microcomputer 205 starts the low output to the signal line CS. Next, the camera microcomputer 205 prepares to receive the next data, and then stops the low output to the signal line CS.

After detecting the low signal input from the signal line CS, the lens microcomputer 111 analyzes the received data input from the signal line DATA and performs internal processing tagged with the received data. After confirming that the signal level of the signal line CS has returned to the high level, the lens microcomputer 111 continuously outputs two-byte data to be transmitted to the signal line DATA. After completing outputting the stop bit SP of the second byte, the lens microcomputer 111 starts the low output to the signal line CS. Next, the lens microcomputer 111 prepares to receive the next data, and then stops the low output to the signal line CS.

The adapter microcomputer 302 which is not designated as a communication partner of the P2P communication does not take part in the operations of the signal line CS and the signal line DATA.

As described above, the signal propagated using the signal line CS in the P2P communication acts as a control signal indicating a transmission end on the transmission side and a standby request for the next data transmission.

While FIG. 5 illustrates an illustrative communication waveform of the P2P communication, the present invention is not limited to this embodiment. For example, data may be transmitted every one byte or another number.

<Description of Communication Mode Switching>

Figure 6:
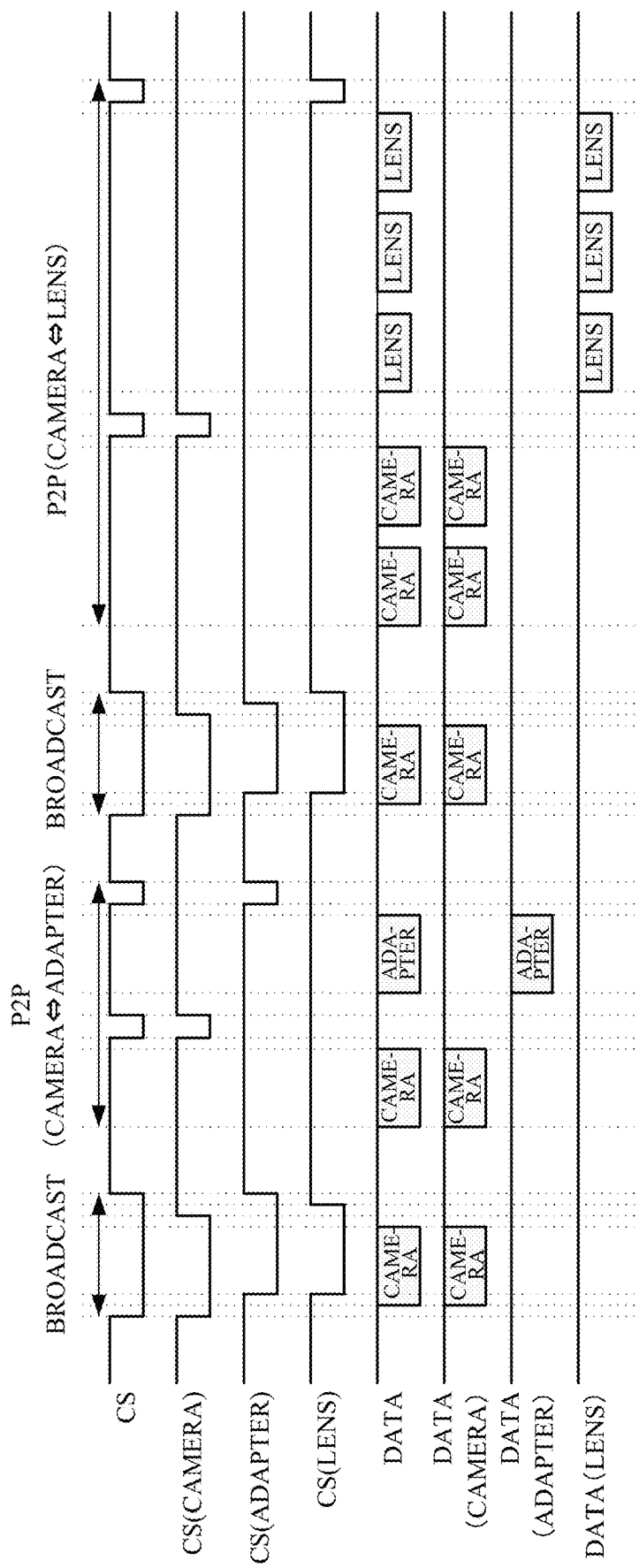
FIG. 6 illustrates a communication waveform when a communication method is switched.

Referring now to FIG. 6, a description will be given of an illustrative switching method between the broadcast communication and the P2P communication performed among the camera microcomputer 205, the lens microcomputer 111, and the adapter microcomputer 302 and an illustrative specifying method of a communication partner in the P2P communication. FIG. 6 illustrates a communication waveform when the communication method is switched. The communication partner in the P2P communication is designated by the broadcast communication. In the following description, after the adapter microcomputer 302 is designated as the communication partner of the P2P communication by the camera microcomputer 205, the P2P communication of the one-byte transmission from the camera microcomputer 205 and the one-byte transmission from the adapter microcomputer 302 starts. Next, after the lens microcomputer 111 is designated as a communication partner of the P2P communication by the camera microcomputer 205, the P2P communication of the two-byte transmission from the camera microcomputer 205 and three-byte transmission from the lens microcomputer 111 follows.

First, the camera microcomputer 205, which is a communication master, executes the broadcast communication by the procedure described with reference to FIG. 4. What is notified by this broadcast communication is slave designation data (communication partner designated data) for specifying a communication partner with the camera microcomputer 205 in the next P2P communication. The lens microcomputer 111 and the adapter microcomputer 302, which are communication slaves, each determine whether or not they are specified as communication partners of the P2P communication based on the slave specification data received by the broadcast communication. The camera microcomputer 205 and the designated communication slave are switched to the P2P communication by this broadcast communication. Since the adapter microcomputer 302 is designated as the communication partner, the data is transmitted and received between the camera microcomputer 205 and the adapter microcomputer 302 in the procedure described with reference to FIG. 5 in the P2P communication. As described above, first, the camera microcomputer 205 transmits the one-byte data to the adapter microcomputer 302, and then the adapter microcomputer 302 transmits the one-byte data to the camera microcomputer 205.

When the P2P communication ends between the camera microcomputer 205 and the adapter microcomputer 302, the camera microcomputer 205 designates, through the broadcast communication, the lens microcomputer 111 as a communication partner for communication in the P2P communication. By this broadcast communication, the adapter microcomputer 302 ends the P2P communication, and the lens microcomputer 111 switches to the P2P communication. When the broadcast communication is not executed, the P2P communication continues between the camera microcomputer 205 and the adapter microcomputer 302. In the P2P communication, the data is transmitted and received between the camera microcomputer 205 and the lens microcomputer 111 in the procedure described with reference to FIG. 5. As described above, the camera microcomputer 205 transmits the two-byte data to the lens microcomputer 111, and then the lens microcomputer 111 transmits the three-byte data to the camera microcomputer 205.

As described above, the counterpart of the P2P communication can be specified by the broadcast communication, and the broadcast communication and the P2P communication can be switched.

<Communication Flow Explanation>

A description will be given of a communication flow control as a communication procedure among the camera microcomputer 205, the lens microcomputer 111, and the adapter microcomputer 302.

Figure 7A:
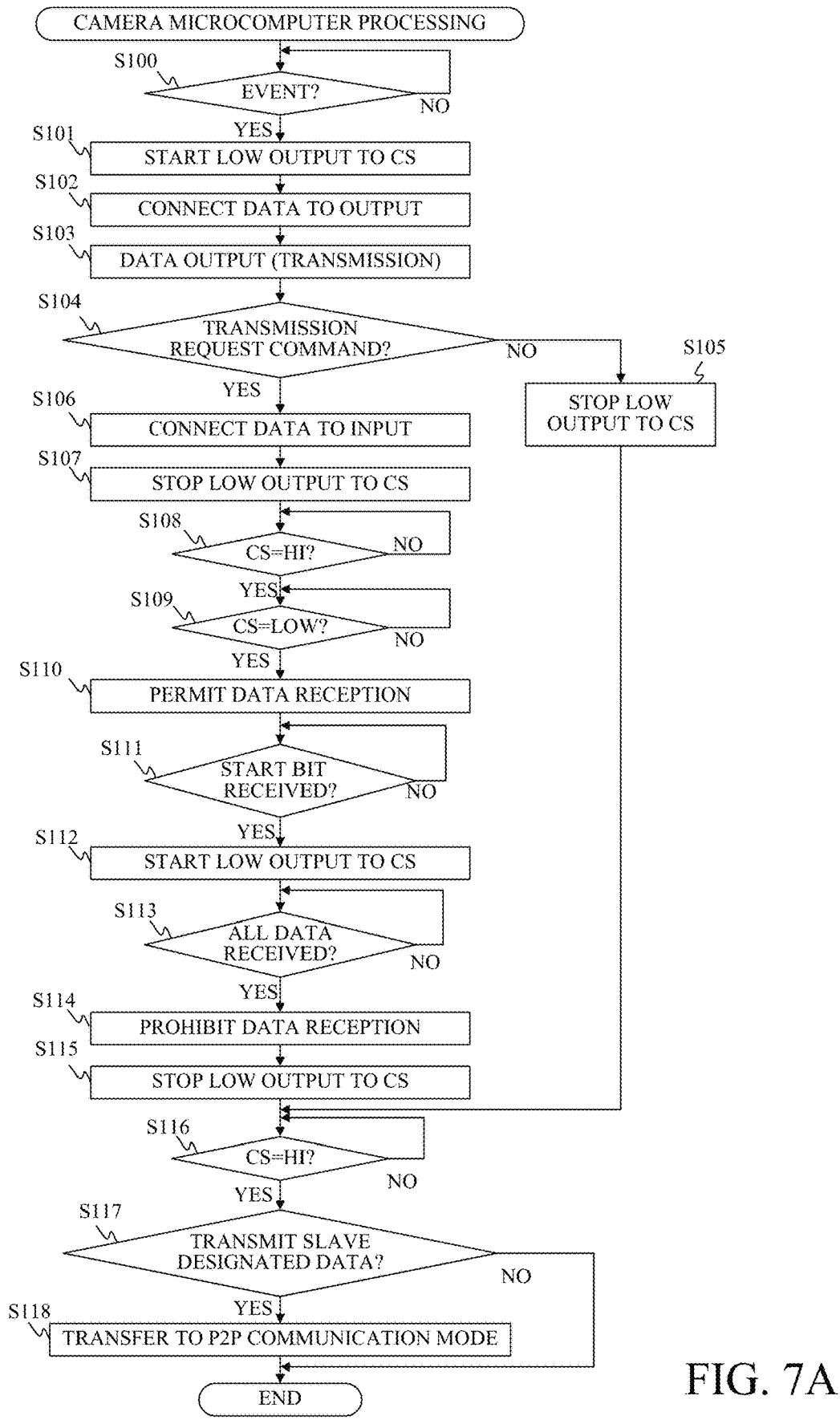
FIG. 7A illustrates a flowchart for explaining a communication flow in a broadcast communication by a communication master.
Figure 7B:
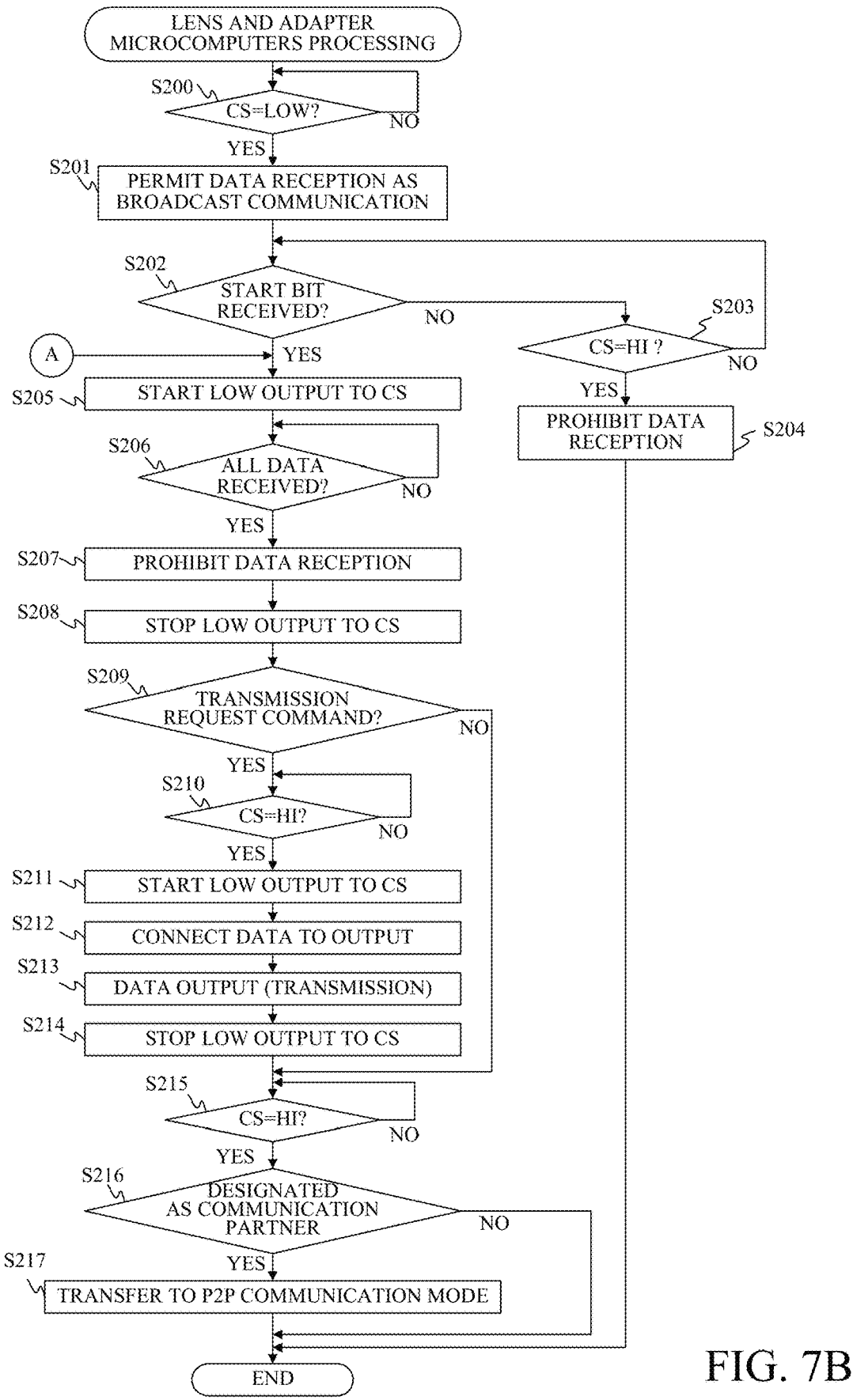
FIG. 7B illustrates a flowchart for explaining a communication flow in the broadcast communication by a communication slave.

A communication flow in the broadcast communication will be described with reference to FIGS. 7A and 7B. FIG. 7A is a flowchart for explaining the communication flow in the broadcast communication by the camera microcomputer 205 which is the communication master. FIG. 7B is a flowchart for explaining the communication flow in the broadcast communication by the lens microcomputer 111 and the adapter microcomputer 302 as the communication slaves.

A description will now be given of the communication flow of the camera microcomputer 205.

In the step S100, the camera microcomputer 205 determines whether an event to start the broadcast communication has occurred. If the event has occurred, the flow proceeds to the step S101. If no event has occurred, the determination in the step S100 is repeated.

In the step S101, the camera microcomputer 205 turns on (connects) the ground switch 2081 to start the low output to the signal line CS. Thereby, the start of the broadcast communication is notified to the lens microcomputer 111 and the adapter microcomputer 302.

In the step S102, the camera microcomputer 205 operates the I/O switch 2082 to connect the signal line DATA to the data output unit in the camera microcomputer 205.

In the step S103, the camera microcomputer 205 starts the data transmission.

In the step S104, the camera microcomputer 205 determines whether the data transmitted in the step S103 includes a transmission request command. The transmission request command is a command for requesting the communication slave that has received the data transmitted from the camera microcomputer 205 as the communication master to transmit data to the camera microcomputer 205. If the transmission request command is included, the flow proceeds to the step S106. If the transmission request command is not included, the flow proceeds to the step S105.

In the step S105, the camera microcomputer 205 turns off (cuts off) the ground switch 2081 to stop the low output to the signal line CS.

In the step S106, the camera microcomputer 205 operates the I/O switch 2082 to connect the signal line DATA to the data input unit in the camera microcomputer 205.

In the step S107, the camera microcomputer 205 turns off (cuts off) the ground switch 2081 to stop the low output to the signal line CS.

In the step S108, the camera microcomputer 205 determines whether the signal level of the signal line CS is high. If the signal level is high, the flow proceeds to the step S109. If the signal level is not high, the determination in the step S108 is repeated.

In the step S109, the camera microcomputer 205 determines whether the signal level of the signal line CS is low. If the signal level is low, the flow proceeds to the step S110. If the signal level is not low, the determination in the step S109 is repeated.

In the step S110, the camera microcomputer 205 permits the data reception from the signal line DATA.

In the step S111, the camera microcomputer 205 determines whether the reception of the start bit from the signal line DATA has been detected. If the reception of the start bit is detected, the flow proceeds to the step S112. If the reception of the start bit is not detected, the determination in the step S111 is repeated.

In the step S112, the camera microcomputer 205 turns on (connects) the ground switch 2081 to start the low output to the signal line CS.

In the step S113, the camera microcomputer 205 determines whether all data has been received. If all data has been received, the flow proceeds to the step S114. If all data has not been received, the determination in the step S113 is repeated.

In the step S114, the camera microcomputer 205 prohibits the data from being received from the signal line DATA.

In the step S115, the camera microcomputer 205 turns off (cuts off) the ground switch 2081 to stop the low output to the signal line CS.

In the step S116, the camera microcomputer 205 determines whether the signal level of the signal line CS is high. If the signal level is Hi, the flow proceeds to the step S117. If the signal level is not high, the determination in the step S116 is repeated.

In the step S117, the camera microcomputer 205 determines whether the data transmitted in the step S103 is the slave designation data for designating a communication partner. If it is slave designation data, the flow proceeds to the step S118. If it is not the slave designation data, this flow ends.

In the step S118, the camera microcomputer 205 shifts to the P2P communication mode.

Next follows a description of the communication flow of the adapter microcomputer 302. Since the communication flow of the lens microcomputer 111 is substantially the same as the communication flow of the adapter microcomputer 302, the description will be omitted in this embodiment.

In the step S200, the adapter microcomputer 302 determines whether the signal level of the signal line CS is low. If the signal level is low, the flow proceeds to the step S201. If the signal level is not low, the determination in the step S200 is repeated.

In the step S201, the adapter microcomputer 302 permits the data reception from the signal line DATA as the broadcast communication.

In the step S202, the adapter microcomputer 302 determines whether reception of the start bit from the signal line DATA has been detected. If the reception of the start bit is detected, the flow proceeds to the step S205. If the reception of the start bit is not detected, the flow proceeds to the step S203.

In the step S203, the adapter microcomputer 302 determines whether the signal level of the signal line CS is high. If the signal level is high, the flow proceeds to the step S204. If the signal level is not high, the flow returns to the step S202.

In the step S204, the adapter microcomputer 302 prohibits the data from being received from the signal line DATA.

The processing in the steps S203 and S204 is performed to handle a situation where the P2P communication is performed between the camera microcomputer 205 and the lens microcomputer 111 and only the adapter microcomputer 302 performs the broadcast communication. In this situation, the adapter microcomputer 302 does not receive the data from the camera microcomputer 205.

In the step S205, the adapter microcomputer 302 turns on (connects) the ground switch 3031 to start the low output to the signal line CS.

In the step S206, the adapter microcomputer 302 determines whether all data have been received. If all data are received, the flow proceeds to the step S207. If all data are not received, the determination in the step S206 is repeated.

In the step S207, the adapter microcomputer 302 prohibits data from being received from the signal line DATA.

In the step S208, the adapter microcomputer 302 turns off (cuts off) the ground switch 3031 to stop the low output to the signal line CS.

In the step S209, the adapter microcomputer 302 determines whether the data received in the step S206 includes a transmission request command. If the transmission request command is included, the flow proceeds to the step S210. If the transmission request command is not included, the flow proceeds to the step S215.

In the step S210, the adapter microcomputer 302 determines whether the signal level of the signal line CS is high. If the signal level is high, the flow proceeds to the step S211. If the signal level is not high, the determination in the step S210 is repeated.

In the step S211, the adapter microcomputer 302 turns on (connects) the ground switch 3031 to start the low output to the signal line CS.

In the step S212, the adapter microcomputer 302 operates the I/O switch 3032 to connect the signal line DATA to the data output unit in the adapter microcomputer 302.

In the step S213, the adapter microcomputer 302 starts the data transmission.

In the step S214, the adapter microcomputer 302 turns off (cuts off) the ground switch 3031 to stop the low output to the signal line CS.

In the step S215, the adapter microcomputer 302 determines whether the signal level of the signal line CS is high. If the signal level is high, the flow proceeds to the step S216. If the signal level is not high, the determination in the step S215 is repeated.

In the step S216, the adapter microcomputer 302 determines whether the data received in the step S206 is the slave designation data and is designated as a communication partner of the camera microcomputer 205 in the P2P communication. If the data is the slave designation data and is designated as the communication partner, the flow proceeds to the step S217. If the data is not the slave designation data or is not designated as the communication partner, the flow ends.

In the step S217, the adapter microcomputer 302 shifts to the P2P communication mode.

Figure 8A:
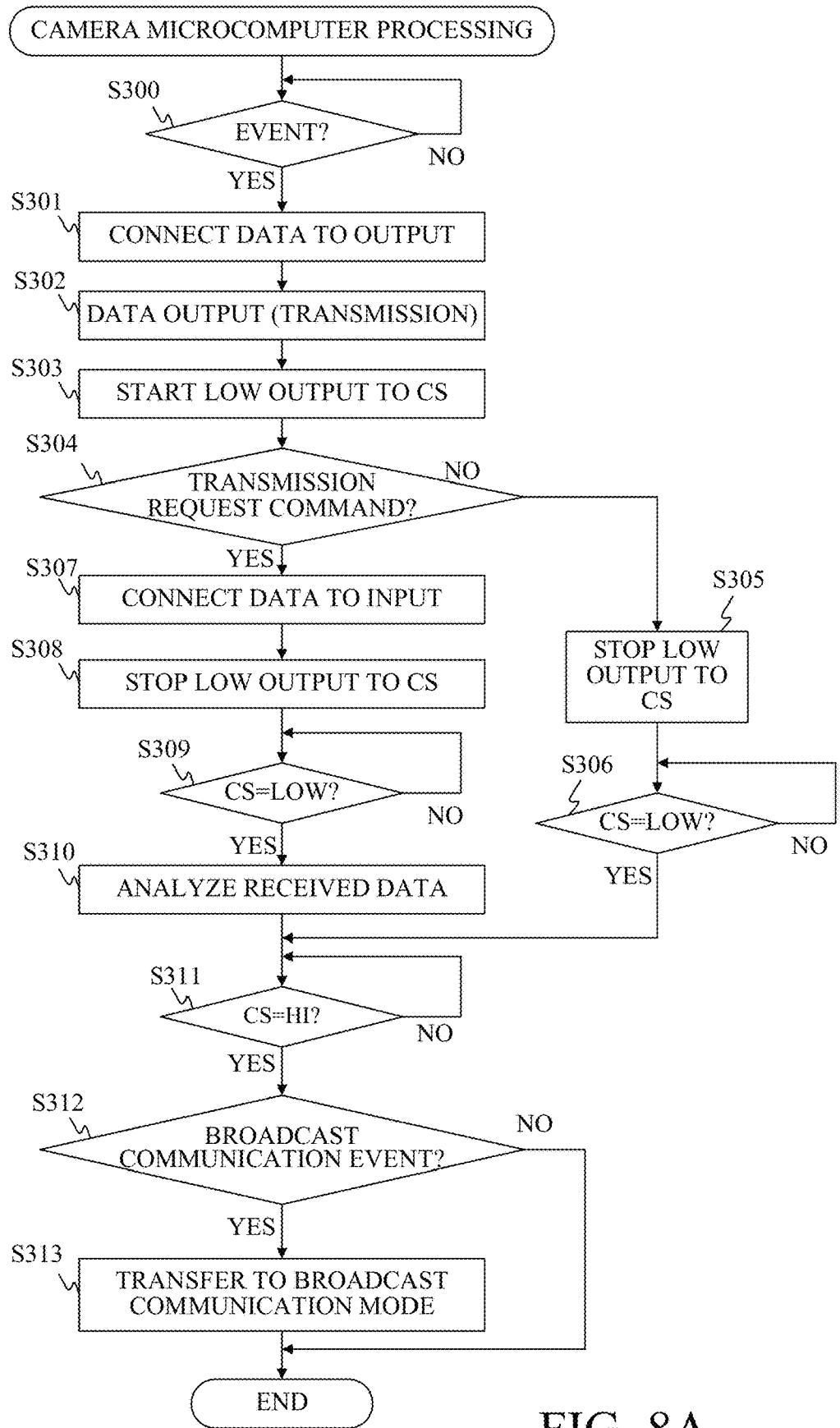
FIG. 8A illustrates a flowchart for explaining a communication flow in a P2P communication by the communication master.
Figure 8B:
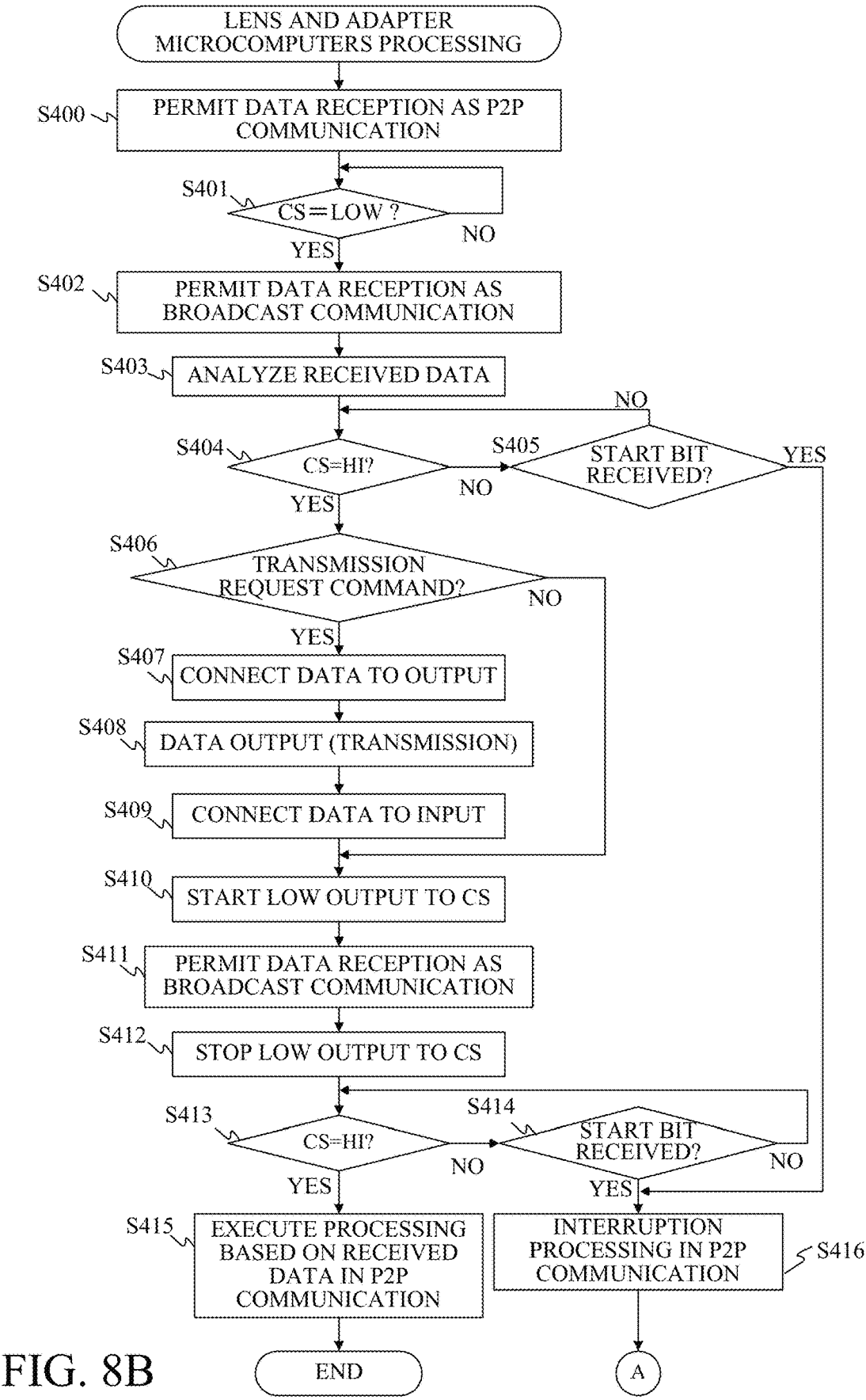
FIG. 8B illustrates a flowchart for explaining a communication flow in the P2P communication by the communication slave.

Referring now to FIGS. 8A and 8B, a description will be given of a communication flow in the P2P communication. FIG. 8A is a flowchart for explaining the communication flow in the P2P broadcast communication by the camera microcomputer 205 which is the communication master. FIG. 8B is a flowchart for explaining the communication flow in the P2P broadcast communication by the lens microcomputer 111 and the adapter microcomputer 302 as communication slaves.

The communication flow of the camera microcomputer 205 will now be described.

In the step S300, the camera microcomputer 205 determines whether an event to start the P2P communication has occurred. If an event has occurred, the flow proceeds to the step S301. If no event has occurred, the determination in the step S300 is repeated.

In the step S301, the camera microcomputer 205 operates the I/O switch 2082 to connect the signal line DATA to the data output unit in the camera microcomputer 205.

In the step S302, the camera microcomputer 205 starts the data transmission.

In the step S303, the camera microcomputer 205 turns on (connects) the ground switch 2081 to start the low output to the signal line CS.

In the step S304, the camera microcomputer 205 determines whether the data transmitted in the step S302 includes a transmission request command. If the transmission request command is included, the flow proceeds to the step S307. If the transmission request command is not included, the flow proceeds to the step S305.

In the step S305, the camera microcomputer 205 turns off (cuts off) the ground switch 2081 to stop the low output to the signal line CS.

In the step S306, the camera microcomputer 205 determines whether the signal level of the signal line CS is low. If the signal level is low, the flow proceeds to the step S311. If the signal level is not low, the determination in the step S306 is repeated.

In the step S307, the camera microcomputer 205 operates the I/O switch 2082 to connect the signal line DATA to the data input unit in the camera microcomputer 205.

In the step S308, the camera microcomputer 205 turns off (cuts off) the ground switch 2081 to stop the low output to the signal line CS.

In the step S309, the camera microcomputer 205 determines whether the signal level of the signal line CS is low. If the signal level is low, the flow proceeds to the step S310. If the signal level is not low, the determination in the step S309 is repeated.

In the step S310, the camera microcomputer 205 analyzes the data received from the signal line DATA.

In the step S311, the camera microcomputer 205 determines whether the signal level of the signal line CS is high. If the signal level is high, the flow proceeds to the step S312. If the signal level is not high, the determination in the step S311 is repeated.

In the step S312, the camera microcomputer 205 determines whether a transition event to the broadcast communication has occurred. If the event has occurred, the flow proceeds to the step S313, and if no event has occurred, this flow ends.

In the step S313, the camera microcomputer 205 shifts to the broadcast communication mode.

Next follows a description of the communication flow of the adapter microcomputer 302. Since the communication flow of the lens microcomputer 111 is substantially the same as the communication flow of the adapter microcomputer 302, a description thereof will be omitted in this embodiment.

In the step S400, the adapter microcomputer 302 permits the data reception from the signal line DATA as the P2P communication.

In the step S401, the adapter microcomputer 302 determines whether the signal level of the signal line CS is low. If the signal level is low, the flow proceeds to the step S402. If the signal level is not low, the determination in the step S401 is repeated.

In the step S402, the adapter microcomputer 302 permits the data reception from the signal line DATA as the broadcast communication.

In the step S403, the adapter microcomputer 302 analyzes the data received from the signal line DATA.

In the step S404, the adapter microcomputer 302 determines whether the signal level of the signal line CS is high. If the signal level is high, the flow proceeds to the step S406. If the signal level is not high, the flow proceeds to the step S405.

In the step S405, the adapter microcomputer 302 determines whether the reception of the start bit from the signal line DATA has been detected. If the reception of the start bit is detected, the flow proceeds to the step S416. If the reception of the start bit is not detected, the flow proceeds to the step S404.

In the step S406, the adapter microcomputer 302 determines whether the data received in the step S403 includes a transmission request command. If the transmission request command is included, the flow proceeds to the step S407. If the transmission request command is not included, the flow proceeds to the step S410.

In the step S407, the adapter microcomputer 302 operates the I/O switch 3032 to connect the signal line DATA to the data output unit in the adapter microcomputer 302.

In the step S408, the adapter microcomputer 302 starts the data transmission.

In the step S409, the adapter microcomputer 302 operates the I/O switch 3032 to connect the signal line DATA to the data input unit in the adapter microcomputer 302.

In the step S410, the adapter microcomputer 302 turns on (connects) the ground switch 3031 to start the low output to the signal line CS.

In the step S411, the adapter microcomputer 302 permits the data reception from the signal line DATA as the broadcast communication.

In the step S412, the adapter microcomputer 302 turns off (cuts off) the ground switch 3031 to stop the low output to the signal line CS.

In the step S413, the adapter microcomputer 302 determines whether the signal level of the signal line CS is high. If the signal level is high, the flow proceeds to the step S415. If the signal level is not high, the flow proceeds to the step S414.

In the step S414, the adapter microcomputer 302 determines whether the reception of the start bit from the signal line DATA has been detected. If the reception of the start bit is detected, the flow proceeds to the step S416. If the reception of the start bit is not detected, the flow proceeds to the step S413.

In the step S415, the adapter microcomputer 302 executes processing based on the data received in the step S403. The P2P communication can be continued by restarting this flow after the processing in the step S415 is executed.

In the step S416, the adapter microcomputer 302 interrupts the processing in the P2P communication. Thereafter, the flow proceeds to the step S205 in FIG. 7B to perform the broadcast communication.

As described above, in this embodiment, in the camera system performing the communication by two lines or the signal line CS and the signal line DATA, the information propagated in the signal line CS is appropriately switched between the broadcast communication mode and the P2P communication mode. Thus, the communication among the camera microcomputer 205 and the lens microcomputer 111 and the adapter microcomputer 302 can be realized with a small number of signal lines.

In the P2P communication mode, in this embodiment, the broadcast communication slave waits to receive the broadcast communication while receiving the control signal indicating the standby request after the data transmission or while the signal level of the signal line CS is low. More specifically, as described in the steps S402 and S411 in FIG. 8B, the communication slave permits the data reception from the signal line DATA as the broadcast communication. Then, if data is received during that period (steps S405 and S414 in FIG. 8B), the P2P communication is interrupted (step S416 in FIG. 8B), and the mode can be transferred to the broadcast communication mode.

Figure 9:
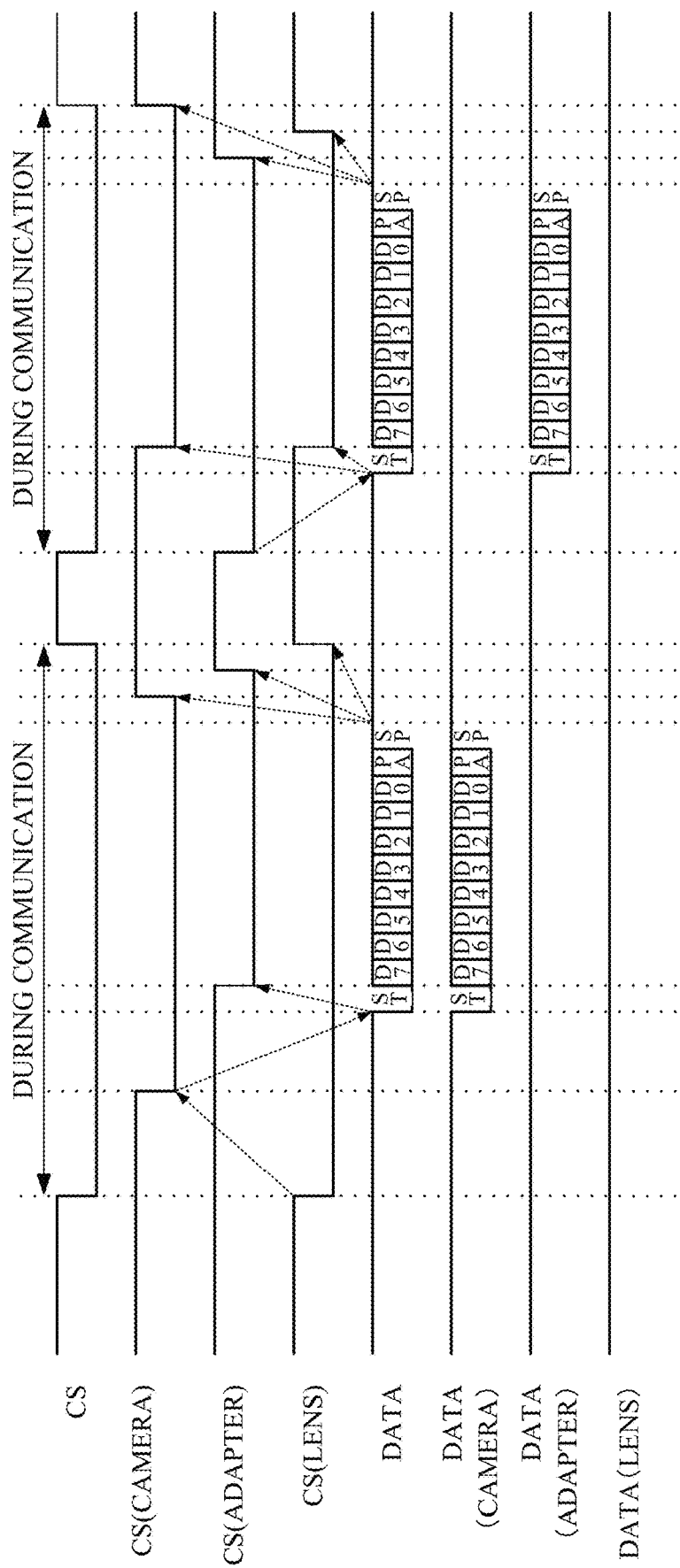
FIG. 9 illustrates a communication waveform in the broadcast communication.

Referring now to FIG. 9, a description will be given of the broadcast communication starting with the lens microcomputer 111 and the adapter microcomputer 302 which are communication slaves. FIG. 9 illustrates a signal waveform in the broadcast communication. Starting the broadcast communication with the communication slave is called a communication request. The communication request to the camera microcomputer 205 is executed when the communication slave independently resumes the broadcast communication with the camera microcomputer 205 while the communication from the camera microcomputer 205 to the communication slave is paused. The following illustration will now describe a case in which the lens microcomputer 111 notifies the start of the broadcast communication and the adapter microcomputer 302 performs the broadcast communication in response to the broadcast communication from the camera microcomputer 205.

First, the lens microcomputer 111 starts the low output to the signal line CS in order to notify the camera microcomputer 205 and the adapter microcomputer 302 of the start of the broadcast communication. Next, the camera microcomputer 205 when detecting that the signal level of the signal line CS has become low level starts the low output to the signal line CS. Since the lens microcomputer 111 has already started the low output to the signal line CS at this time, the signal level of the signal line CS does not change.

Next, the camera microcomputer 205 outputs the data to be transmitted to the signal line DATA. On the other hand, the adapter microcomputer 302 starts the low output to the signal line CS when the start bit ST input from the signal line DATA is detected. Since the camera microcomputer 205 has already started the low output to the signal line CS at this time, the signal level of the signal line does not change.

After completing outputting the stop bit SP, the camera microcomputer 205 stops the low output to the signal line CS. On the other hand, after the lens microcomputer 111 and the adapter microcomputer 302 receive the stop bit SP input from the signal line DATA, they analyze the received data and perform internal processing tagged with the received data. Next, the lens microcomputer 111 and the adapter microcomputer 302 prepare to receive the next data, and then stop the low output to the signal line CS. As described above, the signal level of the signal line CS becomes high when all of the camera microcomputer 205, the lens microcomputer 111, and the adapter microcomputer 302 stop the low output to the signal line CS. Thus, by confirming that the signal level of the signal line CS becomes high, it can be determined that all the microcomputers have completed the processing relating to the current communication and are ready for the next communication.

After confirming that the signal level of the signal line CS returns to the high level, the adapter microcomputer 302 starts the low output to the signal line CS in order to notify the camera microcomputer 205 and the lens microcomputer 111 that the broadcast communication is to be started. Next, the adapter microcomputer 302 outputs the data to be transmitted to the signal line DATA. On the other hand, the camera microcomputer 205 and the lens microcomputer 111 start the low output to the signal line CS when the start bit ST input from the signal line DATA is detected. Since the adapter microcomputer 302 has already started the low output to the signal line CS at this time, the signal level of the signal line CS does not change.

After completing outputting the stop bit SP, the adapter microcomputer 302 stops the low output to the signal line CS. On the other hand, after receiving the stop bit SP input from the signal line DATA, the camera microcomputer 205 and the lens microcomputer 111 analyze the received data and perform the internal processing tagged with the received data. Next, the camera microcomputer 205 and the lens microcomputer 111 prepare to receive the next data, and then stop the low output to the signal line CS.

The broadcast communication starts with the lens microcomputer 111 and the adapter microcomputer 302 which are communication slaves, only when all of the camera microcomputer 205, the lens microcomputer 111, and the adapter microcomputer 302 are in the broadcast communication mode.

When the broadcast communication starts with the communication slave, the camera microcomputer 205, which is the communication master, cannot determine which of the lens microcomputer 111 and the adapter microcomputer 302 has made the signal line CS low. Therefore, the camera microcomputer 205 needs to communicate with both the lens microcomputer 111 and the adapter microcomputer 302 to acquire information as to whether or not it has started the broadcast communication.

The timing when the camera microcomputer 205 outputs the low signal to the signal line CS to start the broadcast communication and the timing when the communication slave lowers the signal line CS to start the broadcast communication may coincide with each other. Then, the camera microcomputer 205 cannot detect that the communication slave has output the low signal to the signal line CS, and thus may notify a permission notice that permits the communication slave to start the broadcast communication.

As described above, this embodiment starts the broadcast communication mode from the communication slave in the camera system that uses the signal line CS and the signal line DATA for communications. Thereby, the camera microcomputer 205 does not have to constantly communicate with the lens microcomputer 111 and the adapter microcomputer 302, preventing the unnecessary communication and reducing the communication traffic.

Figure 10:
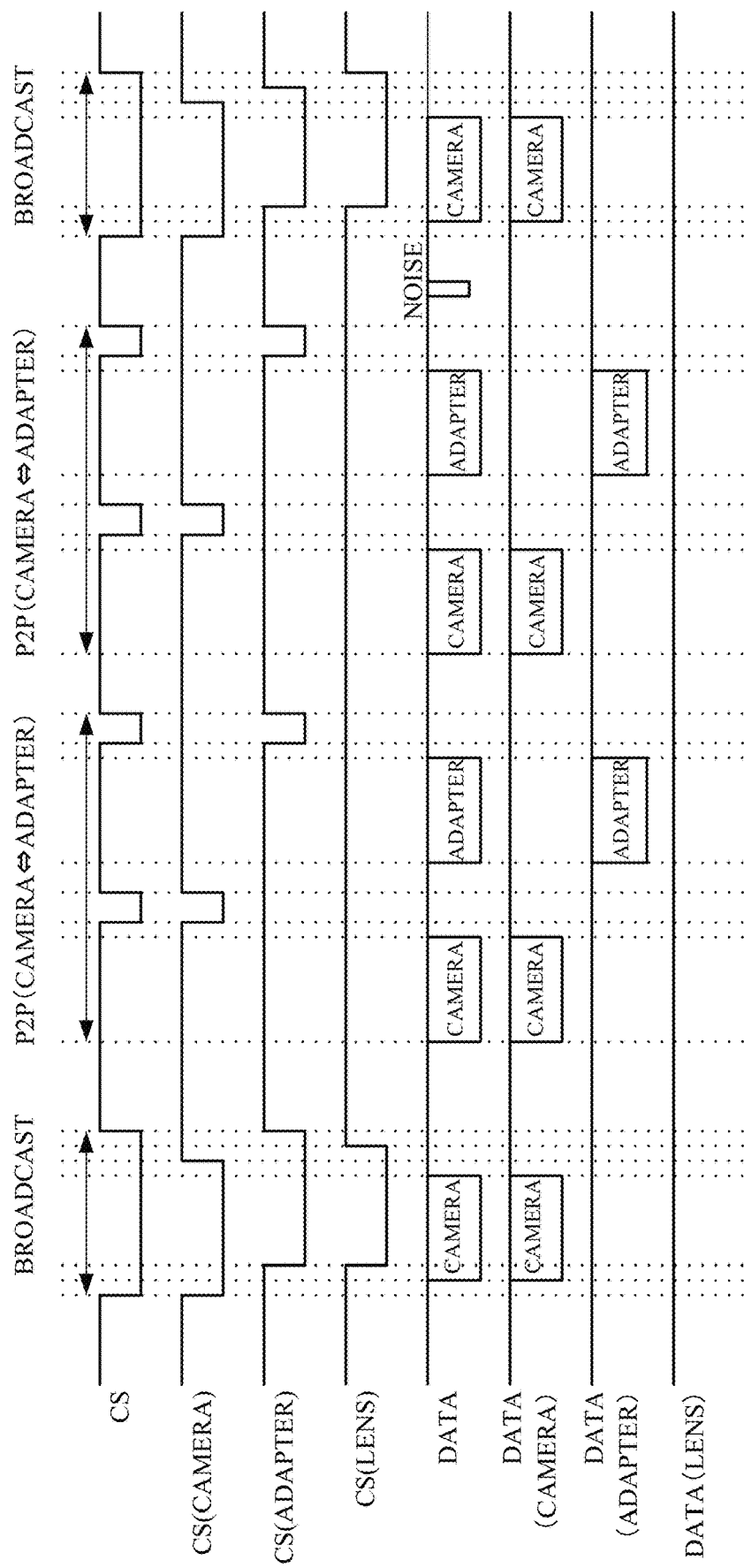
FIG. 10 illustrates a communication waveform when a noise is generated in a signal line DATA.

Referring now to FIG. 10, a description will be given of the operation of the adapter microcomputer 302 that misrecognizes (erroneously recognizes) the trailing edge of the signal line CS indicating the start of the broadcast communication output from the camera microcomputer 205 as the start of the standby request after the data transmission of the P2P communication. FIG. 10 illustrates a communication waveform when the noise is generated in the signal line DATA before a return to the broadcast communication.

FIG. 10 illustrates that the noise is generated in the signal line DATA before a return to the broadcast communication after the camera microcomputer 205 designates the adapter microcomputer 302 by the broadcast communication and performs the communication for two rounds by the P2P communication. This noise does not affect the camera microcomputer 205 or the lens microcomputer 111 which is not designated as a communication partner of the P2P communication. Thus, even when the noise is generated in the signal line DATA, the camera microcomputer 205 starts the low output to the signal line CS so as to notify the communication slave of the start of the broadcast communication when the event to start the broadcast communication occurs.

The lens microcomputer 111 not designated as the communication partner in the P2P communication determines that the signal level of the signal line CS is low, and permits the data reception from the signal line DATA by the broadcast communication. Thus, the lens microcomputer 111 can normally receive the subsequent broadcast communication data.

On the other hand, the adapter microcomputer 302 performs the P2P communication and waits for the signal level of the signal line CS to be low. The noise occurs in the signal line DATA in FIG. 10 with the adapter microcomputer 302 in this state. Thus, the adapter microcomputer 302 erroneously recognizes the trailing edge of the signal line CS indicating the start of the broadcast communication output from the camera microcomputer 205 as the standby request after data transmission of the P2P communication. In other words, the adapter microcomputer 302 determines that data transmission from the camera microcomputer 205 is completed.

In this embodiment, since the adapter microcomputer 302 has received the control signal even if erroneously recognizing that it has received the control signal indicating the standby request after the data transmission, it permits a data reception from the signal line DATA by the broadcast communication as described above. Then, the adapter microcomputer 302 analyzes the data received from the signal line DATA, and stands by until the signal line CS becomes at a high level or it receives the start bit from the signal line DATA.

Thus, even when the camera microcomputer 205 transmits the broadcast communication data, the adapter microcomputer 302 interrupts the processing of the P2P communication by detecting the reception of the start bit while receiving the control signal, and transfers to the broadcast communication mode. In other words, during the communication with the camera microcomputer 205 in the P2P communication, the adapter microcomputer 302 switches the P2P communication (second communication method) to the broadcast communication in response to the data reception via the data communication channel where the notification channel is at a low level (second level). The adapter microcomputer 302 switches to the communication method even when erroneously recognizing that switching of the voltage level of the notification channel from high (first level) to low to indicate the start of the broadcast communication, as part of the completion notice indicating that the data transmission from the camera microcomputer 205 in the P2P communication has been completed. Thus, the adapter microcomputer 302 can normally receive the broadcast communication data transmitted by the camera microcomputer 205. In other words, even when the noise is generated in the signal line DATA before a return to the broadcast communication, the communication slave can normally receive the broadcast communication data transmitted from the camera microcomputer 205.

As described above, in this embodiment, the communication slave may erroneously recognize the trailing edge of the signal line CS indicating the start of the broadcast communication as the start of the standby request after the data transmission in the P2P communication, due to the noise generated in the signal line DATA. Nevertheless, even in this case, the communication slave can normally receive the subsequent broadcast communication data by the processing in the steps S402, S405 and S416 in FIG. 8B. Since the communication slave provides all processing in the above steps, the camera microcomputer 205 can continue the communication without knowing any noises or the communication slave having misrecognized the meaning of the signal line CS.

Figure 11:
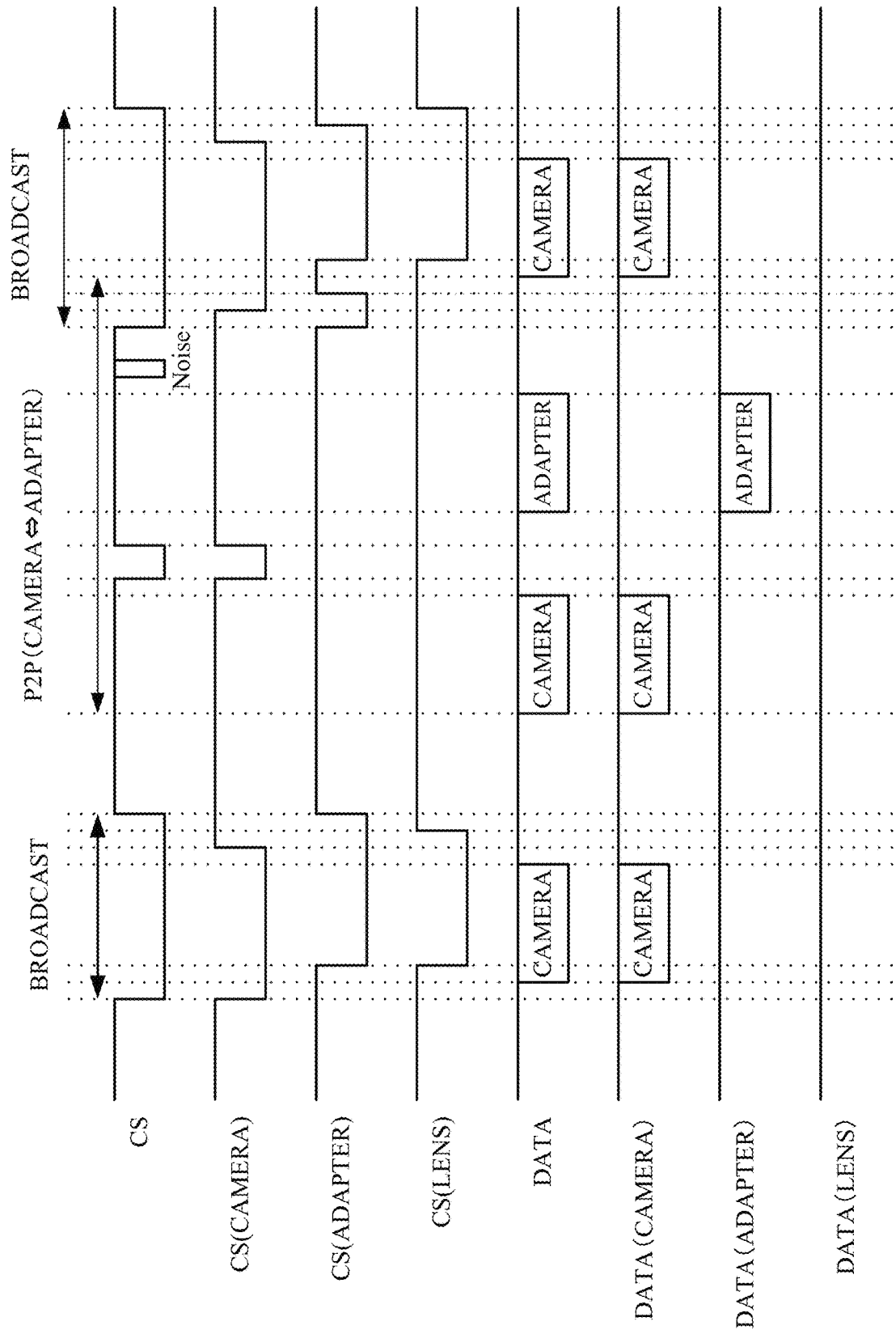
FIG. 11 illustrates a communication waveform when a noise is generated in a signal line CS.

Referring now to FIG. 11, a description will be given of an operation where the camera microcomputer 205 erroneously recognizes the standby state after the data transmission in the P2P communication output from the adapter microcomputer 302 as the trailing edge of the signal line CS indicating the start of the broadcast communication or the communication request. FIG. 11 illustrates a communication waveform when the noise is generated in the signal line CS before the standby request output by the adapter microcomputer 302.

In FIG. 11, after the camera microcomputer 205 designates the adapter microcomputer 302 by the broadcast communication and communicates with it in the P2P communication, the noise is generated in the signal line CS before the adapter microcomputer 302 outputs the standby request.

The camera microcomputer 205 performs the P2P communication just before the noise is generated. In other words, the camera microcomputer 205 stops the standby request output and waits for the signal line CS to be low. If the noise is generated in the signal line CS in this state, the camera microcomputer 205 determines that data transmission from the adapter microcomputer 302 is completed, and analyzes the data received from the signal line DATA. When the noise in the signal line CS disappears, the signal level in the signal line CS becomes high, so the camera microcomputer 205 waits for the event to start the broadcast communication.

On the other hand, after transmitting data, the adapter microcomputer 302 starts the low output to the signal line CS without detecting that the noise is generated in the signal line CS. The camera microcomputer 205 erroneously recognizes the low output to the signal line CS by the adapter microcomputer 302 as the communication request. In other words, the camera microcomputer 205 determines that the event to start broadcast communication has occurred, and transfers to the broadcast communication mode. Next, the camera microcomputer 205 starts the low output to the signal line CS.

The lens microcomputer 111 not designated as the communication partner in the P2P communication determines that the signal level of the signal line CS is low, and permits the data reception from the signal line DATA by the broadcast communication. Therefore, the lens microcomputer 111 can normally receive the subsequent broadcast communication data.

On the other hand, the adapter microcomputer 302 starts the low output to the signal line CS, connects the signal line DATA to the data input unit, and then stops the low output to the signal line CS. Since the adapter microcomputer 302 stops the low output to the signal line CS, the adapter microcomputer 302 permits the data reception from the signal line DATA by the broadcast communication. Then, the adapter microcomputer 302 stands by until the signal level of the signal line CS becomes high or it receives the start bit from the signal line DATA.

After starting the low output to the signal line CS, the camera microcomputer 205 connects the signal line DATA to the data output unit for the data transmission. While receiving the control signal from the signal line CS, the adapter microcomputer 302 detects the reception of the start bit, interrupts the P2P communication processing, and starts the low output to the signal line CS. This is the processing in the steps S414 and S416 in FIG. 8B and the step S205 in FIG. 7B described above. Hence, the adapter microcomputer 302 can normally receive the broadcast communication data transmitted by the camera microcomputer 205. In other words, even if the noise occurs in the signal line CS before the standby request output from the adapter microcomputer 302, the communication slave can normally receive the broadcast communication data transmitted from the camera microcomputer 205.

As described above, in this embodiment, the camera microcomputer 205 may erroneously recognize the standby request after the data transmission in the P2P communication output from the adapter microcomputer 302 as the start of the broadcast communication or the communication request due to the noise generated in the signal line CS. However, even in this case, the communication slave can normally receive the subsequent broadcast communication data by the processing in the steps S411, S414, and S416. Since the communication slave provides all processing in the above steps, the camera microcomputer 205 can continue the communication without knowing any noises or any misrecognitions of the meaning of the signal line CS.

As described above, a misrecognition may occur due to the noise influence when the communication master recognizes the trailing edge of the signal line CS as the start of broadcast communication, whereas the communication slave recognizes it as the standby request after the data transmission in the P2P communication. Nevertheless, even in this case, the communication slave can normally receive the broadcast communication from the communication master through the processing in the steps S402, S405, S411, S414 and S416.

The above misrecognition may occur due to various factors as well as the noise in the signal line DATA and the signal line CS. For example, when the communication data itself unintentionally changes, in particular, when the misrecognition about the transmission request command occurs or when only the communication slave restarts due to the noise in the power supply line.

The communication slave can correctly receive broadcast communication in any cases. In other words, the communication master when determining the abnormality in the communication, the internal processing, etc., can correctly restart the communication with all communication slaves by starting broadcast communication regardless of the previous communication state.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-95098, filed on May 17, 2018, which is hereby incorporated by reference herein in its entirety.

What is claimed is:

1. An accessory apparatus attachable to and detachable from a camera, the accessory apparatus comprising an accessory controller configured to control a communication with the camera using a notification channel used to transmit a signal between the camera and the accessory apparatus and a data communication channel used for a data communication between the camera and the accessory apparatus,
   wherein the accessory controller is configured to switch between a first communication method used for communications between the camera and all accessory apparatuses connected to the camera and a second communication method used for an individual communication with the camera, and
   wherein the accessory controller is configured to switch, in the second communication method, from the second communication method to the first communication method when detecting a start of the data communication in the first communication method in the communication.

2. The accessory apparatus according to claim 1, wherein the accessory controller detects the start of data communication in the first communication method by receiving data via the data communication channel while the accessory controller receives a control signal through the notification channel in the communication in the second communication method.

3. The accessory apparatus according to claim 1, wherein the accessory controller permits a data reception via the data communication channel in the first communication method when the accessory controller receives a control signal via the notification channel in the communication in the second communication method or when starts outputting the control signal via the notification channel in the communication in the second communication method.

4. The accessory apparatus according to claim 1, wherein the accessory controller switches from the first communication method to the second communication method when the accessory controller receives communication partner designated data indicating that the accessory apparatus is selected as the communication partner of the camera, via the data communication channel in the data communication in the first communication method.

5. The accessory apparatus according to claim 1, wherein the accessory controller is configured to set a voltage level of the notification channel to one of a first level and a second level different from the first level.

6. The accessory apparatus according to claim 5, wherein the voltage level of the notification channel is the first level when the data is received via the data communication channel in the first communication method, and the voltage level of the notification channel is the second level when the data is received via the data communication channel in the second communication method, and
wherein the accessory controller switches the communication from the first communication method to the second communication method when receiving the data via the data communication channel in the communication with the camera in the second communication method while the voltage level of the notification channel is the second level.

7. The accessory apparatus according to claim 6, wherein a completion notice indicating that a data transmission is completed from the camera is expressed by switching from the second level to the first level after the voltage level of the notification channel is changed from the first level to the second level, in the second communication method, and
wherein the accessory controller switches the communication from the second communication method to the first communication method when receiving the data via the data communication channel while the voltage level of the notification channel is the second level, even in a middle of the completion notice.

8. The accessory apparatus according to claim 5, wherein the accessory controller transmits the data via the data communication channel after receiving the data from the camera in the communication in the first communication method and after the accessory controller changes the voltage level of the notification channel from the second level to the first level while the voltage level of the notification channel is the second level.

9. The accessory apparatus according to claim 5, wherein the accessory controller resumes the communication with the camera in the first communication method, by changing the voltage level of the notification channel from the second level to the first level while the data communication with the camera via the data communication channel is paused.

10. The accessory apparatus according to claim 5, wherein the accessory controller start transmitting the data to the camera in the communication in the second communication method when the voltage level of the notification channel changes from the first level to the second level after the accessory controller starts receiving the data from the camera.

11. The accessory apparatus according to claim 5, wherein the accessory controller changes the voltage level of the notification channel from the second level to the first level after transmitting the data to the camera in the communication in the second communication method.

12. The accessory apparatus according to claim 5, wherein the accessory controller detects the start of the data communication in the first communication method when receiving the data via the data communication channel, when the voltage level of the notification channel is the first level in the communication of the second communication method.

13. The accessory apparatus according to claim 5, wherein the accessory controller permits the data reception via the data communication channel in the first communication method when the voltage level of the notification channel changes from the second level to the first level or the voltage level of the notification channel is changed from the second level to the first level in the communication in the second communication method.

14. A camera system comprising:
an accessory apparatus; and
a camera including an image sensor configured to photoelectrically convert an object image and to output an electric signal, wherein the accessory apparatus is detachably attached to the camera,
wherein the accessory apparatus includes an accessory controller configured to control a communication with the camera using a notification channel used to transmit a signal between the camera and the accessory apparatus and a data communication channel used for a data communication between the camera and the accessory apparatus,
wherein the accessory controller is configured to switch between a first communication method used for communications between the camera and all accessory apparatuses connected to the camera and a second communication method used for an individual communication with the camera, and
wherein the accessory controller is configured to switch, in the second communication method, from the second communication method to the first communication method when detecting a start of the data communication in the first communication method in the communication.

15. A non-transitory computer-readable storage medium storing a program that enables a computer in an accessory apparatus to execute a method, the accessory apparatus being attachable to and detachable from a camera, the accessory apparatus including an accessory controller configured to control a communication with the camera using a notification channel used to transmit a signal between the camera and the accessory apparatus and a data communication channel used for a data communication between the camera and the accessory apparatus,
wherein the method comprising the steps of:
switching between a first communication method used for communications between the camera and all accessory apparatuses connected to the camera and a second communication method used for an individual communication with the camera, and
switching, in the second communication method, from the second communication method to the first communication method when detecting a start of the data communication in the first communication method in the communication.

* * * * *